Aug. 20, 1935.  C. A. SAWTELLE  2,012,025
VEHICLE BRAKE
Filed Sept. 4, 1931  3 Sheets-Sheet 1
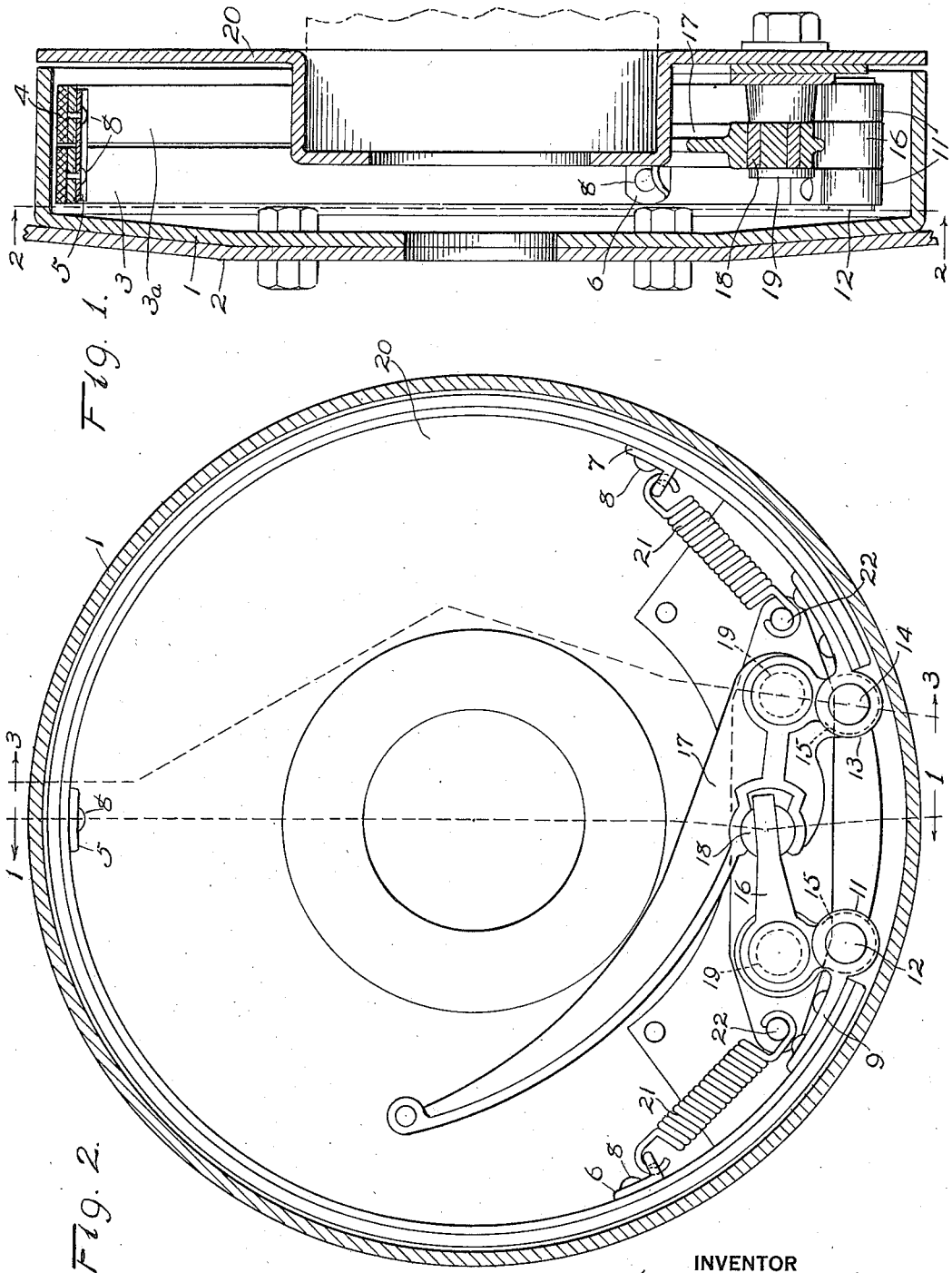
INVENTOR
Charles A. Sawtelle
BY J. S. Murray
ATTORNEY

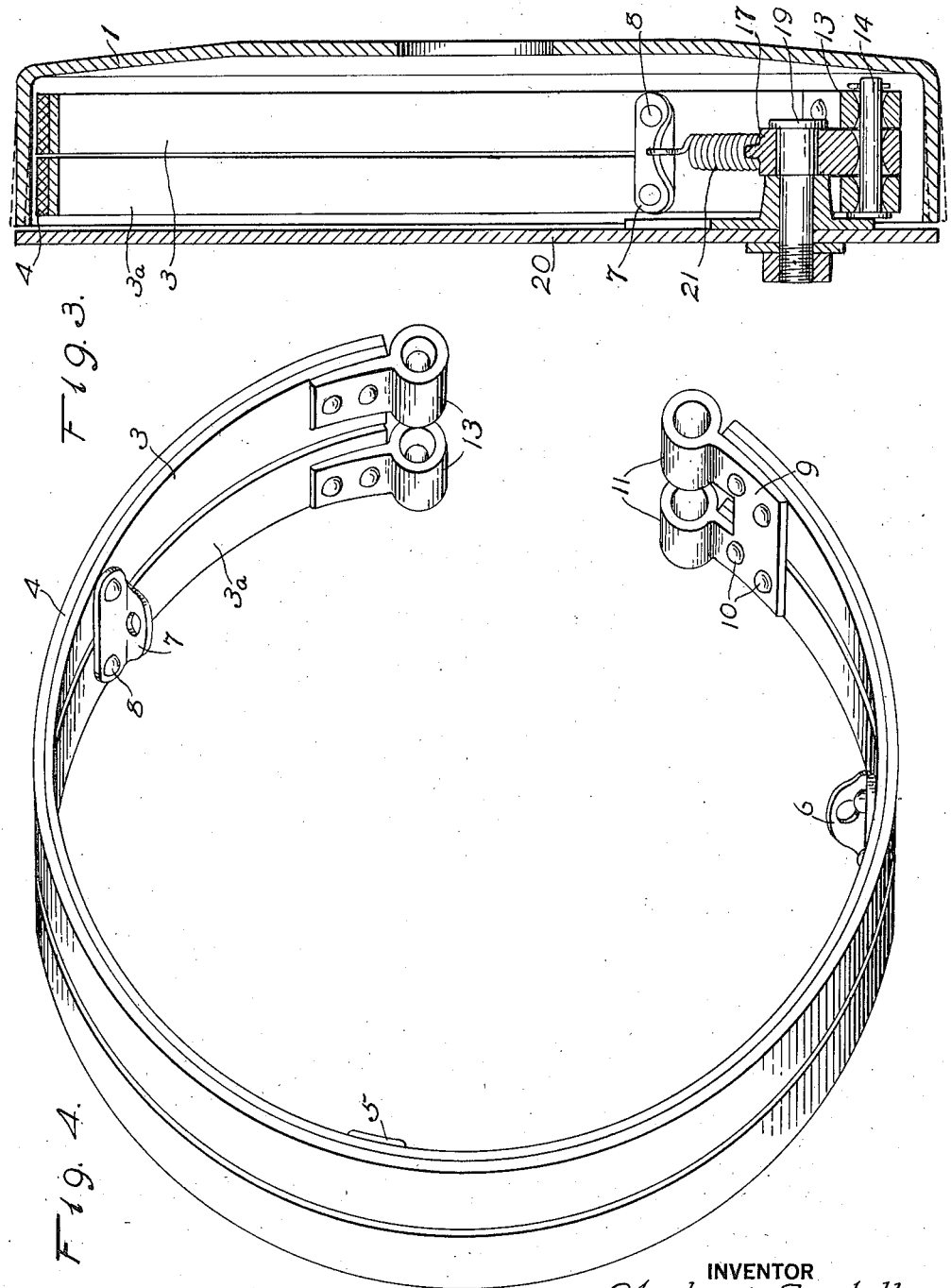

Aug. 20, 1935.  C. A. SAWTELLE  2,012,025
VEHICLE BRAKE
Filed Sept. 4, 1931  3 Sheets-Sheet 3
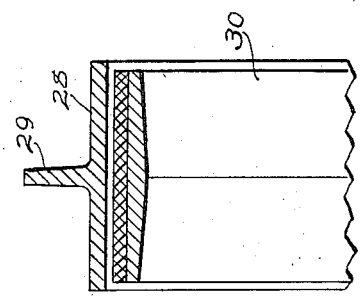
Fig.10.
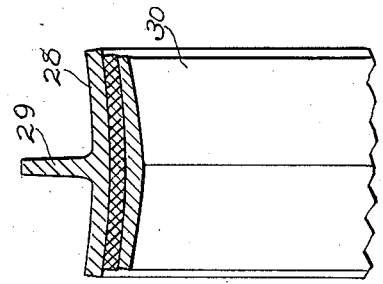
Fig.11.
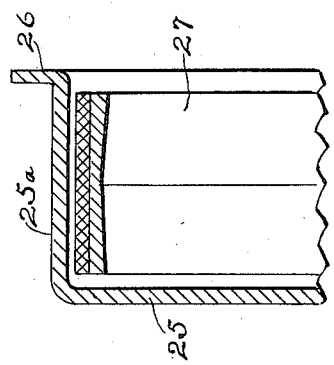
Fig.8.
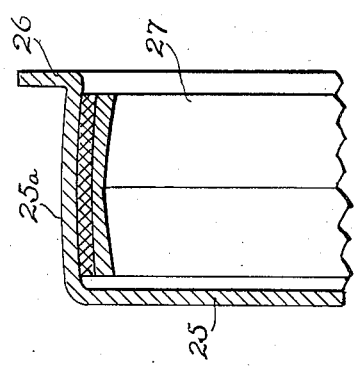
Fig.9.
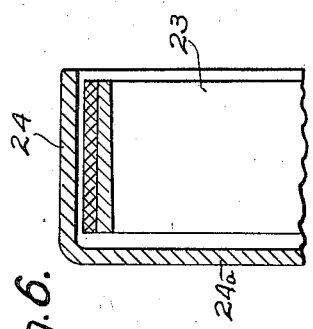
Fig.6.
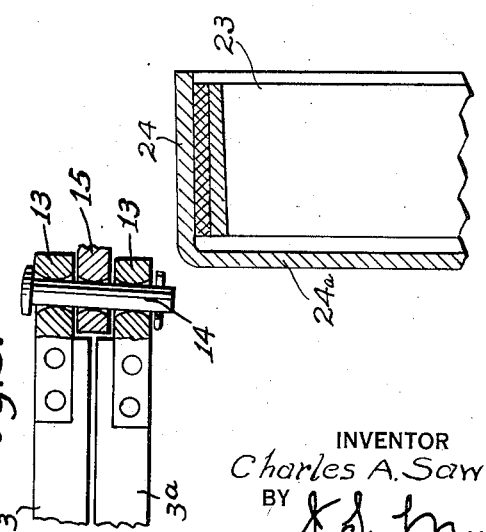
Fig.5.
Fig.7.
INVENTOR
Charles A. Sawtelle
BY J. S. Murray
ATTORNEY Patented Aug. 20, 1935

2,012,025

UNITED STATES PATENT OFFICE 2,012,025

VEHICLE BRAKE

Charles A. Sawtelle, Detroit, Mich., assignor, by direct and mesne assignments, to S. and D. Engineering Company, Detroit, Mich., a corporation of Michigan Application September 4, 1931, Serial No. 561,166

10 Claims. (Cl. 188—78)

This invention relates to brakes and particularly motor vehicle brakes.

An object of the invention is to adapt a plurality of brake bands to engage the same drum, and to establish an actuating connection to said bands such as to equalize the forces applied to each thereof.

Another object is to arrange such bands in a laterally adjoined relation, adapting them to engage adjacent annular regions of the same surface of a brake drum.

A further object is to so connect said bands as to maintain them in a definite lateral proximity to each other while affording them a differential expansion, and permitting them, when applied, to fully conform to a brake drum, despite distortion of the latter by frictionally generated heat.

Still another object is to apply equalized forces to the circumferentially spaced ends of a group of laterally adjoined brake bands, substantially coextensive circumferentially, and to further equalize the forces individually applied to said bands.

A still further object is to adapt a retracting spring to act equally on each of a plurality of laterally adjacent brake bands, to effect their normal withdrawal from the same drum.

It is also an object of the invention to progressively vary the thickness of a brake band, in a direction transverse to its circumference, and thereby secure correspondence, under braking conditions, in the heat-induced distortion of the band and that of a drum against which the band is stressed.

These and various other objects the invention attains by the construction hereinafter described, and illustrated in the accompanying drawings, wherein:

Fig. 1 is a view in diametrical section of a brake drum and twin band brake mechanism interiorly coacting with said drum, the section being taken on the line 1—1 of Fig. 2.

Fig. 2 is a sectional elevation of the same, taken upon the line 2—2 of Fig. 1.

Fig. 3 is a transverse sectional view of the drum and brake mechanism, taken on the line 3—3 of Fig. 2.

Fig. 4 is a perspective view of the unit formed by the twin brake bands.

Fig. 5 is a view of laterally adjacent and relatively free ends of the twin bands, showing, to an exaggerated degree, how a hinge pin carried by said ends is angularly shifted to afford said ends relative circumferential travel.

Fig. 6 is a fragmentary, radial, sectional view of a modified construction of drum and band, showing the latter retracted.

Fig. 7 is a similar view of the same with the band applied to the drum, showing (with exaggeration) a corresponding distortion of drum and band, due to frictional heat.

Fig. 8 is a fragmentary radial section of a drum and band of further modified form, the band being shown retracted.

Fig. 9 is a similar view of the same with the band applied, the distortion of drum and band due to frictional heat being again exaggerated.

Fig. 10 is a radial section of a further modification of drum and band, showing the latter retracted.

Fig. 11 is a similar view, showing the band applied, again exaggerating the corresponding distortion of the parts under frictional heat.

Referring now more in detail to the drawings, and describing initially the construction shown in Figs. 1 to 5, inclusive, 1 designates an ordinary brake drum, suitably secured to a wheel 2.

Interiorly engageable with said drum is a pair of laterally adjacent and circumferentially coextensive brake bands 3 and 3a, each provided with the usual lining 4. Said bands closely adjoin each other, while preferably not contiguous, this relation being maintained primarily by three metal links 5, 6, and 7, connecting said bands at points approximately one hundred and twenty degrees apart. Said links are loosely riveted (or otherwise attached) to the bands, as indicated at 8, allowing a circumferential swinging of the links, permissive of a slight differential expansion of the two bands. Furthermore, the looseness of said rivets affords such tilting of the links, or differential radial travel of their extremities, as is incidental to a slight differential expansion of the two bands.

At corresponding ends, the two bands are connected by a plate 9, secured to the bands by rivets 10 or the like, and said plate is formed with a pair of spaced barrels 11 to receive a hinge pin 12.

The other two ends of the bands independently mount a pair of actuating members 13, apertured to jointly receive a hinge pin 14.

The pins 12 and 14 are loosely engaged by relatively short arms 15 of a pair of bell crank levers, whereof the long arms 16 and 17 are interengaged for actuation in unison. Thus the arm 16 is slidably fitted in a diametrically slotted roller 18, socketed in the arm 17. The bell cranks are pivoted, at the junctures of their long and short arms, upon pins 19, suitably rigidly carried by the usual non-rotative backing plate 20 of the drum. The arm 17 is terminally engageable by a means (not shown) for applying a braking force, and is of a length to afford to said means a considerable leverage.

It will be noted that the openings of the actuating members 13 which receive the pin 14 are flared slightly from their mid portions to their ends to allow such tilting of said pin, as is illustrated in Fig. 5, the bell crank arm 15 engaging said pin having its opening flared in the same way and for the same purpose.

Normal retraction of the bands 3 is effected by a pair of coiled springs 21, extending from a pair of pins 22, secured in any suitable manner to the backing plate, to the links 6 and 7, and engaging the latter substantially midway between the rivets 8 so as to equalize the spring effort applied to the bands.

It is an important advantage of the described construction that the band 3a is capable of expanding to a slightly greater extent than the band 3. Thus when under heat of friction, the rim or flange of the drum 1 is distorted, as exaggeratedly indicated in dash lines in Fig. 3, the band 3a will conform itself, under braking stress, to the more highly expanded portion of the drum, thus assuring efficient use of the entire braking effort.

Also, under the described conditions, the pin 14 will act as an equalizing lever in transmitting the applied force to the relatively free, laterally adjoined band extremities, said pin tilting circumferentially, as Fig. 5 illustrates, to effect equalization of the applied stresses, while expanding the bands differentially.

While the illustrated friction means comprises two bands, it is to be understood that the invention comprehends the use of a larger number of bands, connected in a unitary relation for differential expansion. It is further to be understood that a multiple band mechanism such as here disclosed will conform itself to such drums as are shown in Figs. 8, 9, 10, and 11, as well as to that shown in Figs. 1, 2, and 3.

It is to be noted that actuation of the lever 17 (in the direction of the arrow in Fig. 2) effects an equalized distribution of effort to the two bell cranks and thence to the circumferentially spaced ends of the bands, since the arms 16 and 17 are interengaged at a point substantially midway between the bell crank pivots.

In the modified construction shown in Figs. 6 and 7, a brake band 23 is interiorly engageable with a drum comprising a head 24 and an annular flange or rim 24a. The latter lacks reinforcement or support at its free edge, and consequently responds expansively to frictional heat to a greater extent at said edge than at its juncture with the drum head 24a. Thus, under heat, said flange flares slightly toward its free edge, as exaggeratedly shown in Fig. 7. Consequently, where an ordinary brake band is associated with a drum of the type shown in Figs. 6 and 7, a lack of proper parallelism between the drum and band and consequent sacrifice of efficiency results from any considerable generation of frictional heat. The present invention gradually reduces the thickness of the band from its edge adjacent to the drum head to its edge adjacent the free edge of the drum, with the result that frictional heat expands the brake band differentially in its different annular regions, according to the band thickness in said regions, and constant parallelism of drum and band is achieved regardless of working temperature conditions.

Figs. 8 and 9 illustrate a modification in which a drum comprising a head 25 and a rim 25a is reinforced at the free edge of said rim by a radial, outwardly projecting annular flange 26. Under frictional heat conditions, such a drum expands approximately as indicated in Fig. 8, the rim assuming a slight bow from the drum head to the flange 26.

To compel the brake band 27 to distort correspondingly to said drum under frictional heat, said band is given a minimum thickness in a circumferential plane midway between the band edges, and is progressively increased in thickness toward said edges. Said band responds expansively to heat differentially in different circumferential areas, according to the varying thickness, and consequently maintains parallelism with the drum rim regardless of varying working temperatures.

In the further modification shown in Figs. 10 and 11, there is employed a drum 28 having the nature of an annulus flanged annularly outward as indicated at 29, in a plane midway between the lateral edges of the drum. Any desired suitable support (not shown) for the drum is engaged with the flange 29. Under frictional heat said drum is arcuately distorted as exaggeratedly shown in Fig. 10, the free edge portions expanding in excess of the reinforced central portion.

A brake band 30 interiorly applicable to said drum is compelled to respond to frictional heat similarly to said drum by progressively reducing the thickness of said band from its central circumferential plane to each lateral edge. By selecting a proper angle between the divergent inner and outer faces of said band, a conformity of the band to the drum under all working temperature conditions is secured.

It is a characteristic of all the described constructions that a band or bands is (or are) adapted to fully conform to a brake drum, whether or not the latter is distorted by frictional heat. It has been found that the invention eliminates a marked loss of efficiency which has heretofore characterized band type brakes when applied under sufficient stress and for an adequate time interval to frictionally develop considerable heat.

While it is apparent that the illustrated embodiment of my invention herein disclosed is well calculated to adequately fulfill the objects and advantages primarily stated, it is to be noted that the invention is susceptible to variation, modification and change within the spirit and scope of the subjoined claims.

What I claim is:
1. The combination with a plurality of expansible, arcuate brake bands, arranged in lateral proximity to one another, of means connecting said bands at a plurality of circumferentially spaced points maintaining their lateral proximity and affording them differential expansion.

2. The combination with a plurality of expansible arcuate brake bands arranged in mutual lateral proximity, of a plurality of swinging links connecting said bands, and spaced circumferentially of the bands, said links maintaining mutual lateral proximity of the bands while affording them differential expansion.

3. The combination with a plurality of substantially coextensive, expansible, arcuate brake bands, arranged in mutual lateral proximity, of a rigid connection between corresponding ends of said bands, and means jointly carried by the other ends of said bands for receiving an actuating force, said means affording the bands a differential response to such force.

4. The combination with a plurality of substantially coextensive, expansible, arcuate brake bands, arranged in mutual lateral proximity, of means connecting said bands, maintaining their lateral proximity and affording them differential expansion, and means terminally carried by said bands for applying the same actuating force to both bands.

5. The combinations with a plurality of substantially coextensive, expansible, arcuate brake bands, arranged in mutual lateral proximity, of a pair of lugs carried by corresponding ends of said bands, having normally aligned openings and a pin mounted in said openings for transmitting an actuating force to both bands, said pin having a limited angular movement in said openings to afford the bands a differential expansion.

6. A brake comprising a brake drum, a plurality of laterally adjacent brake bands engageable with said drum, means rigidly connecting corresponding ends of said bands, and actuating means for said bands having an engagement with the other ends of said bands, affording them differential expansion, and adapted to equalize the forces applied to the respective bands.

7. In a brake, the combination with two laterally adjacent arcuate brake bands having corresponding laterally spaced ends, thrust-receiving elements mounted on said ends, an actuating member projecting between said elements, and a pressure equalizer connecting said thrust receiving elements and passing operatively through said actuating member.

8. A brake, comprising a brake drum, a plurality of laterally adjacent, substantially coextensive, expansible brake bands interiorly engageable with said drum, a spring retractively acting on all of said bands, and a member connecting said spring to the bands affording the bands a differential expansion.

9. A brake comprising a brake drum, a plurality of laterally adjacent brake bands engageable with said drum, a spring retractively acting on all of said bands, and means equalizing the spring action on the several bands.

10. In a brake, the combination with two laterally adjacent friction applying elements having arcuate friction faces, of an operating member for both of said elements, and a pin forming an operating connection between said member and elements, the operating member and said elements having openings receiving said pin, said openings being flared from their mid portions to their ends, to allow tilting of said pin to equalize the forces transmitted to said elements.

CHARLES A. SAWTELLE.